United States Patent [19]
Wallis

[11] 4,154,434
[45] May 15, 1979

[54] BOOT ARRANGEMENT FOR PISTON-CYLINDER ASSEMBLY

[76] Inventor: Bernard J. Wallis, 25200 Trowbridge Ave., Dearborn, Mich. 48124

[21] Appl. No.: 845,605

[22] Filed: Oct. 26, 1977

[51] Int. Cl.² ............................................. F16F 9/10
[52] U.S. Cl. .................................... 267/119; 74/18.2; 92/155; 92/158; 137/860; 184/24; 267/65 R; 267/130
[58] Field of Search .................. 267/65 R, 65 A, 119, 267/130; 188/322, 264 B; 74/18.2; 92/155, 158, 168; 277/30, 230, DIG. 6; 137/516.15, 860; 184/24

[56] References Cited

U.S. PATENT DOCUMENTS

| 2,149,040 | 2/1939 | Binder et al. | 74/18.2 X |
|---|---|---|---|
| 2,163,255 | 6/1939 | Binder et al. | 188/322 |
| 2,394,364 | 2/1946 | Christensen | 92/168 X |
| 2,668,549 | 2/1954 | Lebus | 74/18.2 X |
| 2,904,961 | 9/1959 | Herbert | 74/18.2 X |
| 3,363,644 | 1/1968 | Malec | 137/860 X |
| 3,947,005 | 3/1976 | Wallis | 267/119 |
| 4,005,763 | 2/1977 | Wallis | 267/119 X |

Primary Examiner—George E. A. Halvosa
Attorney, Agent, or Firm—Barnes, Kisselle, Raisch & Choate

[57] ABSTRACT

A flexible boot surrounds a piston rod and is sealed at one end to the free end portion of the piston rod and at its other end to the rod end of the associated cylinder. The head end of the cylinder is connected to a source of gas under pressure and the interior of the boot communicates freely with the interior of the cylinder at the rod end thereof. A check valve is provided for relieving the pressure in the boot when it reaches a predetermined value.

7 Claims, 5 Drawing Figures

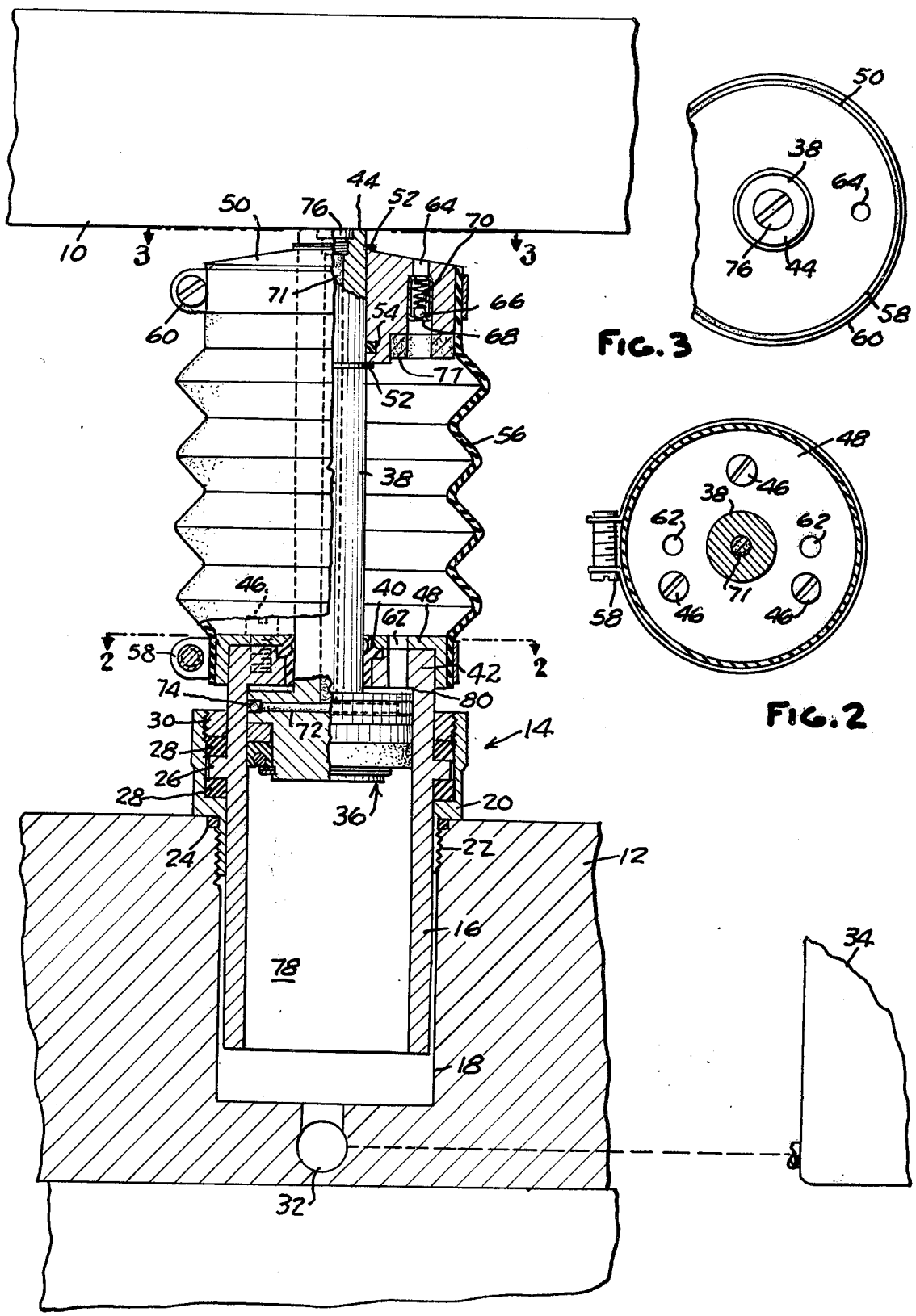

BOOT ARRANGEMENT FOR PISTON-CYLINDER ASSEMBLY

This invention relates to fluid springs of the type employed between metal-forming dies, and, more particularly, to a piston rod boot arrangement for preventing the ingress of dirt, liquids and other contaminants to the working parts of the cylinder, piston and piston rod.

Where metal is shaped, cut or otherwise formed between a pair of dies it is not uncommon to employ a plurality of fluid cylinders between the opposed die members for biasing them apart, that is, to the open or separated position, when the work stroke has been completed. Frequently one side of each cylinder is connected to a source of inert gas (nitrogen) at high pressure which applies a constant high pressure against one side of the piston in the cylinder, the piston rod on the other side of the cylinder bearing against the movable die member. The life of such piston-cylinder assemblies is often relatively short because of the dirt and other contaminants which accumulate or are deposited on the working surfaces of the cylinder, piston and piston rod.

The primary object of this invention is to prolong the life of such piston-cylinder assemblies by preventing the ingress of dirt and other common contaminants to the working parts of such assemblies.

More particularly, it is an object of this invention to provide a boot sealed around the piston rod and adapted to elongate and contract in response to reciprocation of the piston. The boot is sealed to the cylinder at one end and to the rod at its other end. Passageways are provided in the rod end of the cylinder which establish free communication between the boot and the adjacent end of the cylinder. A check valve is also provided for relieving the pressure in the boot when it exceeds a predetermined value. Thus, the atmosphere surrounding the working parts of the piston, piston rod and cylinder is comprised exclusively of the high pressure gas to which the head end of the cylinder is connected.

Other features, objects and advantages of the present invention will become apparent from the following description and accompanying drawing, in which:

FIG. 1 is a vertical sectional view of a piston-cylinder assembly arranged between a pair of dies and embodying the boot arrangement of the present invention;

FIG. 2 is a sectional view along the line 2—2 in FIG. 1;

FIG. 3 is a sectional view along the line 3—3 in FIG. 1; and

Figure 4:
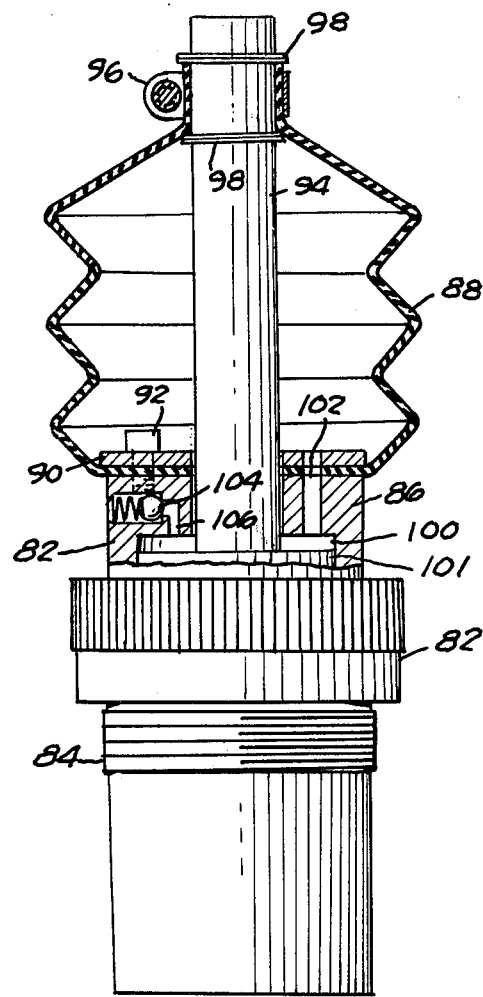
FIGS. 4 and 5 are fragmentary sectional views of modified forms of the invention.

In FIG. 1 there is illustrated an upper movable die member 10 and a lower fixed die member 12. Between these die members there is arranged a piston-cylinder assembly generally designated 14. Assembly 14 comprises a cylinder 16 supported within a bore 18 by means of a sleeve 20. Sleeve 20 is threaded into bore 18 as at 22 with an O-ring 24 forming a sealed connection therebetween. Cylinder 16 is resiliently mounted in sleeve 20 by means of a circumferential annular flange 26 disposed between rubber washers 28 within the sleeve 20 and held in place by means of a ring 30 threaded into the upper end of sleeve 20. The lower end of cylinder 16 is open and communicates directly with bore 18. A passageway 32 in die member 12 establishes free communication between bore 18 and a reservoir 34 which is filled with an inert gas, such as nitrogen, under a relatively high pressure.

Within cylinder 16 there is arranged a piston 36 having a piston rod 38 connected thereto. Piston rod 38 extends through a bushing 40 in the wall 42 at the rod end of the cylinder. Bushing 40 is preferably formed of plastic. The upper end of piston rod 38 engages the upper die member 10 as at 44. The above described arrangement with cylinder 16 resiliently supported for tilting movement is generally similar to that shown in my U.S. Pat. No. 3,947,005, dated Mar. 30, 1976. However, with respect to the present invention, the piston-cylinder assembly may be of any conventional type.

On the upper end of cylinder 16 there is secured, as by screws 46, a cap 48. Cap 48 is in sealed relation with the upper end of the cylinder. A bushing 50 is secured to piston rod 38 adjacent its upper end by means of a pair of snap rings 52. Bushing 50 is sealed to piston rod 38 by means of an O-ring 54. An expandable boot 56, preferably in the form of a bellows, is connected to cap 48 in sealed relation thereto by means of a clamp 58. A similar clamp 60 connects the upper end of boot 56 with bushing 50. Boot 56 is preferably formed of a waterproof, rubber-coated fabric and is capable of withstanding a predetermined pressure, for example, about 25 pounds per square inch. The interior of boot 56 freely communicates with the upper end of cylinder 16 by means of passageways 62 which extend through the top wall 42 of cylinder 16 and cap 48. Within bushing 50 there is formed a passageway 64 in which a check valve assembly 66 is arranged. Valve 66 is urged into closed relation with its seat 68 by means of a spring 70. Spring 70 is dimensioned and constructed to maintain valve 66 closed until the pressure within boot 56 reaches a predetermined maximum, say, one to five pounds per square inch, at which time the pressure within the boot is relieved to atmosphere through passageway 64.

Any suitable means for lubricating the piston-cylinder assembly may be employed. In the arrangement illustrated the lubricating means comprises a wick 71 extending axially through piston rod 38 and communicating with a plurality of radially extending wicks 72 in piston 36. Wicks 72 in turn connect with a wick 74 extending circumferentially around piston 36 and contacting the inner cylindrical wall of cylinder 16. The wick assembly described can be saturated with oil through an opening in the upper end of piston rod 38 which is sealed by a threaded plug 76. An additional oil-saturated wick or fibrous pad 77 is secured to the lower face of bushing 50.

With the above-described arrangement it will be appreciated that gas under a relatively high pressure from reservoir 34 is always in communication with the open lower end of cylinder 16. This gas pressure urges piston 36 and piston rod 38 upwardly and, thus, biases die member 10 in an upward direction. During the working stroke of the press on which the die is located die member 10 is driven downwardly to force at least a portion of the gas below piston 36 back into reservoir 34. As the piston moves downwardly in cylinder 16 the working chamber 78 thereof decreases in size while the idle chamber 80 between piston 36 and top wall 42 progressively increases. Thus the gaseous fluid in boot 56, which collapses or contracts when piston 36 moves downwardly, is forced into idle chamber 80. Consequently, when piston 36 moves upwardly the gaseous fluid in idle chamber 80 is forced through passageway 62 into boot 56 and then is forced back into the idle chamber 80 when boot 56 collapses by reason of the downward movement of the piston. As the piston 36 reciprocates in cylinder 16 it is likely that at least a small amount of pressurized gas will seep by the piston from time to time from a chamber 78 into idle chamber 80 and boot 56. When the pressure of the gas in boot 56 exceeds the setting of check valve 66 the valve will open and relieve the pressure in the boot. Thereafter the assembly will operate in the manner described until the pressure within the boot again exceeds the setting of valve 66. Thus, at no time is air from the surrounding atmosphere permitted to enter into the boot. Likewise, the boot itself prevents dirt particles, contaminated lubricant, liquids, etc. from reaching the working parts of the piston-cylinder assembly. Accordingly, the arrangement described prevents any contaminated air, dirt, liquid, etc. from entering boot 56 and cylinder 16. In this way the life of the piston-cylinder assembly is prolonged substantially. In the arrangement shown in FIG. 4 the cylinder 82 is of the generally conventional type, the head end of which has a threaded extension 84 for connecting the cylinder to a lower fixed die member, such as shown at 12 in FIG. 1. The rod end of cylinder 82 comprises a wall 86 on which the lower end of a boot 88 is clamped in sealed engagement by means of a ring 90 secured in place by screws 92. The upper end of boot 88 is secured to the upper end of piston rod 94 by means of a clamp 96 and held in place by a pair of snap rings 98. The interior of boot 88 communicates with the idle chamber 100 of the cylinder between top wall 86 and the upper end of piston 101 by means of one or more passageways 102 in end wall 86. Idle chamber 100 communicates with the surrounding exterior atmosphere through a check valve 104 and passageway 106. This arrangement operates substantially in the same manner as that previously described with the exception, however, that the pressure relief connects directly with idle chamber 100 rather than with the interior of boot 88.

Figure 5:
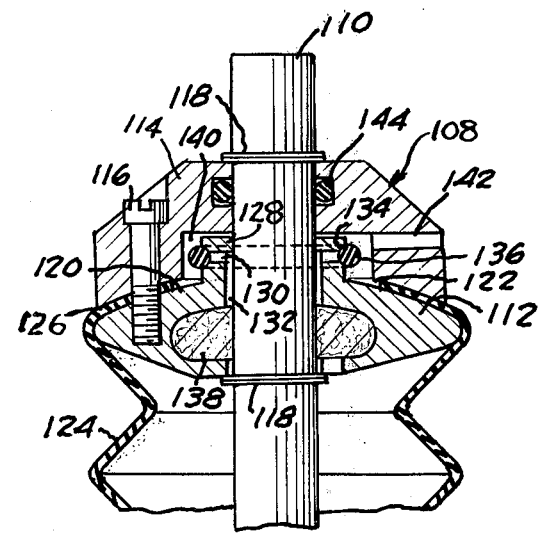

The arrangement shown in FIG. 5, insofar as the piston and cylinder are concerned, can be substantially the same as shown in FIG. 1 or 4. The primary difference between this arrangement and those previously described resides in the construction of the bushing 108 at the upper end of the piston rod 110. Bushing 108 comprises a lower section 112 and an upper section 114 which are secured together by screws 116. The bushing is retained at the upper end of piston 110 by snap rings 118. Lower section 112 of the bushing has a crowned upper surface 120 which conforms generally with the concave lower surface 122 of upper section 114. The upper end of boot 124 has a radially inwardly extending flange 126 which is sealingly clamped between these surfaces.

Lower section 112 has a central upwardly extending portion 128 formed with a plurality of radially extending passageways 130. The inner ends of passageways 130 communicate with the clearance space 132 between the bore in section 112 and the outer periphery of piston rod 110. The outer ends of passageways 130 communicate with a circumferential groove 134 around the outer periphery of extension 128. A rubber O-ring 136 is seated in groove 134. An oil wick 138 is seated within a pocket in lower section 112 which surrounds the piston rod.

The upper section 114 of bushing 108 is formed on its underside with a central recess 140, the peripheral wall of which is spaced radially outwardly from the outer periphery of extension 128 to provide an annular passageway between the two sections of the bushing. One or more radial passageways 142 are formed in upper section 114 which communicate with the annular passageway between the sections and with the surrounding atmosphere. Upper section 114 is sealed to piston rod 110 by means of an O-ring 144.

The arrangement shown in FIG. 5 differs only slightly from that shown in FIG. 1. In this arrangement a very close control of the pressure at which the boot will be relieved can be obtained by the design of O-ring 136. This is true because the O-ring presents substantially greater area on the pressurized side thereof than a spring-biased check valve such as shown in FIGS. 1 and 4. While oil wick 138 is not exposed directly to the interior of boot 124, nevertheless, as the boot contracts and expands, the slight amount of compression and decompression of the gas therein will cause the gas to flow through wick 138. Thus, the gaseous fluid within boot 124 becomes saturated with oil to lubricate the piston rod. This lubrication will be adequate when it is considered that the press on which the fluid cylinder is mounted may be operating at as high as 100 strokes per minute.

In each of the embodiments illustrated in the drawings the cross sectional area within the boot is shown slightly larger than the cross sectional area of the idle chamber of the cylinder. In actual practice the construction is such that these cross sectional areas are not substantially different. As long as the cross sectional areas are not substantially different, the flexibility of the boot wall and the setting of the check valve will eliminate any problems of an unduly high pressure or vacuum in the boot.

I claim:

1. A fluid spring assembly for use between a pair of metal forming die members comprising a fluid cylinder supported at one end on one of said die members, a piston slidable axially in the bore of said cylinder in sealed relation therewith and having a piston rod projecting axially outwardly through the other end of the cylinder and engaging the other die member, said piston dividing the cylinder into a working chamber and an idle chamber which vary inversely in size in response to movement of the piston axially in the cylinder, a passageway connecting said working chamber with a source of gas under high pressure and permitting said gas to flow between said source and said working chamber in response to reciprocation of the piston axially in the cylinder, said piston rod extending through said idle chamber, a generally cylindrical boot surrounding said piston rod and sealingly secured at one end thereof to said piston rod adjacent the end thereof engaging said other die member, said boot also being sealingly secured at its other end with the end of the cylinder through which the rod extends, said boot having a side wall which is flexible both radially and axially, means permitting the free flow of gaseous fluid between the interior of said boot and said idle chamber, said boot and idle chamber being sealed from the working chamber by said piston to prevent the flow of gaseous fluid therebetween except as may occur from slight seepage of said high pressure gas across the sliding seal between the piston and cylinder wall resulting from the differential pressure across the piston, and a pressure relief valve for relieving to atmosphere the gaseous pressure within the boot and idle chamber when it exceeds a predetermined value, said idle chamber and the interior of said boot being sealed from the surrounding atmosphere to prevent at all times the ingress of air from the surrounding atmosphere, the cross sectional area of the boot being not substantially different from the cross sectional area of the cylinder bore so that, as a consequence of the flexibility of the boot side wall, any slight change in the total volume of the boot and idle chamber resulting from reciprocation of the piston is accommodated by flexing of the boot side wall without producing an unduly high pressure or vacuum in the boot, whereby, when the pressure in the boot progressively increases to said predetermined value by reason of the seepage of said high pressure gas across the sliding piston seal, it is relieved by said pressure relief valve.

2. A fluid spring assembly as called for in claim 1 wherein said boot comprises a tubular bellows impervious to the passage of gas, moisture and liquid therethrough.

3. A fluid spring assembly as called for in claim 2 wherein said cylinder has an end wall through which the piston rod extends, said end wall having a first passageway therein extending between the idle chamber and said boot to permit the free flow of gas therebetween, said wall having a second passageway therein extending from said idle chamber to the surrounding atmosphere, said pressure relief valve being located in the last-mentioned passageway.

4. A fluid spring assembly for use between a pair of metal forming die members comprising a fluid cylinder supported at one end on one of said die members, a piston movable axially in said cylinder and having a piston rod projecting axially outwardly through the other end of said cylinder and engaging the other die member, said piston dividing the cylinder into a working chamber and an idle chamber which vary inversely in size in accordance with the movement of the piston axially in the cylinder, means communicating said working chamber with a source of gas under pressure and permitting said gas to flow therebetween in response to movement of the piston axially in the cylinder, said piston rod extending through said idle chamber, an expandable-collapsible boot surrounding said piston rod, means mounting and sealing one end of said boot to the piston rod remote from the piston and its other end to the end of the cylinder through which the rod extends, one of said sealing means comprising a pair of annular bushings connected together in vertically stacked relation and having a pair of confronting faces in sealed relation, the adjacent end of said boot being sealingly connected to said bushings, one of said bushings having a cylindrical boss on the confronting face thereof concentric with the piston rod and through which the piston rod extends, said cylindrical boss having a circumferentially extending groove around the outer periphery thereof and having a plurality or radially extending passageways therein communicating at their outer ends with said groove and communicating at their inner ends with the interior of said boot, an elastic O-ring seated in said groove in sealed relation with said radial passageways and preventing the ingress of fluid to said radial passageways from the outer ends thereof, said other bushing having a cylindrical socket in the confronting face thereof concentric with the piston rod and surrounding said boss with the cylindrical wall of the socket spaced radially outwardly from said O-ring, said last-mentioned bushing having a passageway therein connecting said socket with the surrounding atmosphere whereby, when the pressure in said boot rises to a predetermined value, said O-ring expands to relieve the pressure to the surrounding atmosphere.

5. A fluid spring assembly as called for in claim 4 wherein said bushings are fixedly mounted on the piston rod for reciprocation therewith and means forming a sealed connection between said other bushing and the piston rod.

6. A fluid spring assembly as called for in claim 5 wherein said one bushing has a bore therein concentric with the piston rod and cooperating therewith to form a passageway extending from the inner ends of said radial passageway to the interior of said boot and lubricant-impregnated wick means in said last-mentioned passageway.

7. A fluid spring assembly as called for in claim 5 wherein said one end of the boot is clamped between said confronting faces in sealed relation therewith.

* * * * *